3,111,524
PREPARATION OF 3,5-DINITRO-1,2,4-TRIAZOLE
Richard H. Wiley and Newton R. Smith, Louisville, Ky., assignors, by mesne assignments, to the United States of America as represented by the Secretary of the Navy
No Drawing. Filed May 6, 1957, Ser. No. 657,456
2 Claims. (Cl. 260—308)

This application is a continuation-in-part application of our application Serial No. 516,339, filed in the U.S. Patent Office on June 17, 1955, and now abandoned, for "Preparation of Explosives."

This invention relates to a new process for the preparation of 3,5-dinitro-1,2,4-triazole.

The compound, 3,5-dinitro-1,2,4-triazole is prepared by the diazotization of guanazine. When prepared in accordance with prior methods it was necessary to isolate the compound from the aqueous solution of reaction products by precipitation as the silver salt, followed by recrystallization of this salt from acetonitrile and regeneration of 3,5-dinitro-1,2,4-triazole by precipitation of the silver salt.

The above process is highly disadvantageous because of the sensitivity of the silver salt to explosion. For example, it has an impact sensitivity of 26 cm. (2.5 kg. wt.), thus being more sensitive than tetryl (26 cm.). The sensitivity of this intermediate seriously limits the development of 3,5-dinitro-1,2,4-triazole as a high explosive, or its use as an intermediate in the production of other high explosive compounds such as its methyl derivative described in our co-pending continuation-in-part application Serial No. 656,993, filed in the U.S. Patent Office on May 3, 1957.

It is, therefore, an object of this invention to provide a method for the preparation of 3,5-dinitro-1,2,4-triazole which is safe in operation.

The invention comprises the preparation of 3,5-dinitro-1,2,4-triazole by the diazotization of guanazine followed by ether extraction of the compound.

The invention is illustrated by the following example but is not limited thereby. Thirty grams (0.155 mole) of guanazine hydrobromide and 13.8 grams of sodium bicarbonate in 75 cc. of warm water were added dropwise with stirring to a solution of 225 grams of sodium nitrite and 75 grams of copper nitrate trihydrate in 345 cc. of water with the temperature maintained at 90–95° C. Heating and stirring were continued for one hour and the reaction mixture cooled and filtered. The filtrate was carefully acidified with 150 cc. of concentrated nitric acid under a hood. The solution was shaken with 300 cc. of ether and the two layers separated. The ether extraction was repeated four times. The 3,5-dinitro-1,2,4-triazole was obtained as a crude, hygroscopic solid on evaporation of the ether. The crude product may be purified by fractionation or recrystallization, or by conversion to its water-insoluble guanidine salt followed by recrystallization. Guanazine hydrobromide may be prepared from hydrazine and cyanogen bromide according to the following preferred procedure carried out under a hood because of the toxicity of cyanogen bromide. A three-necked flask is placed in an ice bath and fitted with a mechanical stirrer and a 110° thermometer. Three hundred ml. of water is added and cooled below 5°; then 121 g. of 100% hydrazine (3.78 moles) is added slowly with stirring. Two hundred grams (1.89 moles) of cyanogen bromide is added in approximately one hour, keeping the temperature below 35°. After this addition, the mixture is stirred for 15 minutes and then another 200 g. (1.89 moles) of cyanogen bromide is added in about 15 minutes. The mixture is stirred for about two hours and allowed to stand 12 hours without stirring. Two hundred ml. of isopropyl alcohol is added, the mixture stirred and then filtered on a Buchner funnel with suction. The precipitate is washed with 200 ml. of isopropyl alcohol. The air dried yield is 190–250 g. (52–68%), M.P. 252–7° C. with decomposition.

The new compound, 3,5-dinitro-1,2,4-triazole, may be used as an explosive in casings for artillery shells. The compound may be added in powder form to shell casings by press loading in the same manner as used for loading ammonium picrate. A charge thus prepared is sufficiently insensitive to withstand the shock entailed in the ejection of a shell from a gun barrel, and may be exploded by operation of an impact or time fuse-mechanism firing a detonating explosive such as lead azide or mercury fulminate. The shells produced can be detonated by other conventional means known to the art. The new explosive is stable and sufficiently insensitive to mechanical shock to enable its safe handling in industrial large scale usage.

The use of the compound is not limited to that as an explosive filling for shells. It may be used in analogous applications well known in the art, such as, blasting, these uses being described in part in Army Technical Manual FM5-25, entitled "Explosives and Demolitions."

The compound may be used in combination with other conventional additives for explosives which are well known in the art. For example, it may be mixed with aluminum powder to enhance blast effects or with ammonium nitrate to reduce the cost of the composition. When used with additives, the additive and explosive are thoroughly mixed in powder form in the correct proportions depending upon the desired properties of the final product.

The process described above provides a method for the preparation of 3,5-dinitro-1,2,4-triazole which is safe and practicable.

Obviously, modifications and variations of the present invention are possible in the light of the above teachings. It is therefore to be understood that within the scope of the appended claims the invention may be practiced otherwise than as specifically described.

What is claimed is:

1. The process for the preparation of 3,5-dinitro-1,2,4-triazole which consists essentially of adding, dropwise, guanazine hydrobromide neutralized with sodium bicarbonate to a solution consisting essentially of sodium nitrite and copper nitrate at a temperature of betwen about 90 to about 95° C., heating and stirring the formed solution for a period of about one hour, acidifying the solution with concentrated nitric acid, and separating the formed 3,5-dinitro-1,2,4-triazole directly by ether extraction.

2. In the process of preparing 3,5-dinitro-1,2,4-triazole by the diazotization of guanazine with copper nitrate and sodium nitrite followed by acidification with nitric acid, the improvement which consists essentially of extracting the formed 3,5-dinitro-1,2,4-triazole with ether directly after the acidification step.

No references cited.